United States Patent [19]
Hrubes et al.

[11] Patent Number: 5,353,648
[45] Date of Patent: Oct. 11, 1994

[54] TORQUE TRANSMITTER

[75] Inventors: Franz Hrubes, Rotthalmunster; Karlheinz Timtner, Bad Homburg, both of Fed. Rep. of Germany

[73] Assignees: Ringspann GmbH, Bad Homburg; Micro-Epsilon Messtechnik GmbH & Co. KG, Ortenburg, both of Fed. Rep. of Germany

[21] Appl. No.: 862,386

[22] Filed: Apr. 2, 1992

[30] Foreign Application Priority Data

Apr. 3, 1991 [DE] Fed. Rep. of Germany ....... 4110727

[51] Int. Cl.$^5$ ................................................. G01L 3/00
[52] U.S. Cl. ........................... 73/862.322; 73/862.195
[58] Field of Search ................. 73/862.322, 862.331, 73/862.195; 324/207.7

[56] References Cited

U.S. PATENT DOCUMENTS

| | | | |
|---|---|---|---|
| 2,432,900 | 12/1947 | Jacobsen | 73/862.322 |
| 2,737,049 | 3/1956 | Waugh | 73/862.322 |
| 2,754,683 | 7/1956 | Waugh | 73/862.322 |
| 3,823,608 | 7/1974 | Pautermuehl et al. | 73/862.322 |
| 4,682,104 | 7/1987 | Lombard et al. | 73/862.331 |
| 5,058,438 | 10/1991 | Timtner | |

FOREIGN PATENT DOCUMENTS

| | | |
|---|---|---|
| 2907819 | 2/1979 | Fed. Rep. of Germany . |
| 2939620 | 9/1979 | Fed. Rep. of Germany . |
| 3802684 | 1/1988 | Fed. Rep. of Germany . |
| 3907707 | 3/1989 | Fed. Rep. of Germany . |
| 3918862 | 6/1989 | Fed. Rep. of Germany . |

Primary Examiner—Richard E. Chilcot, Jr.
Assistant Examiner—R. Biegel
Attorney, Agent, or Firm—Bell, Seltzer, Park & Gibson

[57] ABSTRACT

A torque transmitter comprising two members 1, 2 rotatable relative to each other and serving to transmit a torque, and which has the ability to continuously measure the transmitted torque. The transmitter includes a transducer ring 3, and a displacement measuring device 6 having at least two noncontacting sensors 4, 5 for detecting the axial position of the transducer ring 3 relative to a reference member 7. The members 1, 2 are inter-connected via transverse beams and connected with the transducer ring 3 via fork-like members, so that upon a torque being transmitted between the members 1, 2, the latter are rotated relative to one another proportionally to the torque, and the transducer ring 3 is axially displaced. To achieve an error-free and reproducible determination of the torque, the transducer ring 3 and the reference member 7 are provided with surfaces 8, 9 which are substantially parallel to each other and axially aligned with each other, and the sensors 4, 5 occupy a fixed position and are arranged such that they measure against the surfaces 8, 9 either in a direction opposite to each other or toward each other.

15 Claims, 3 Drawing Sheets

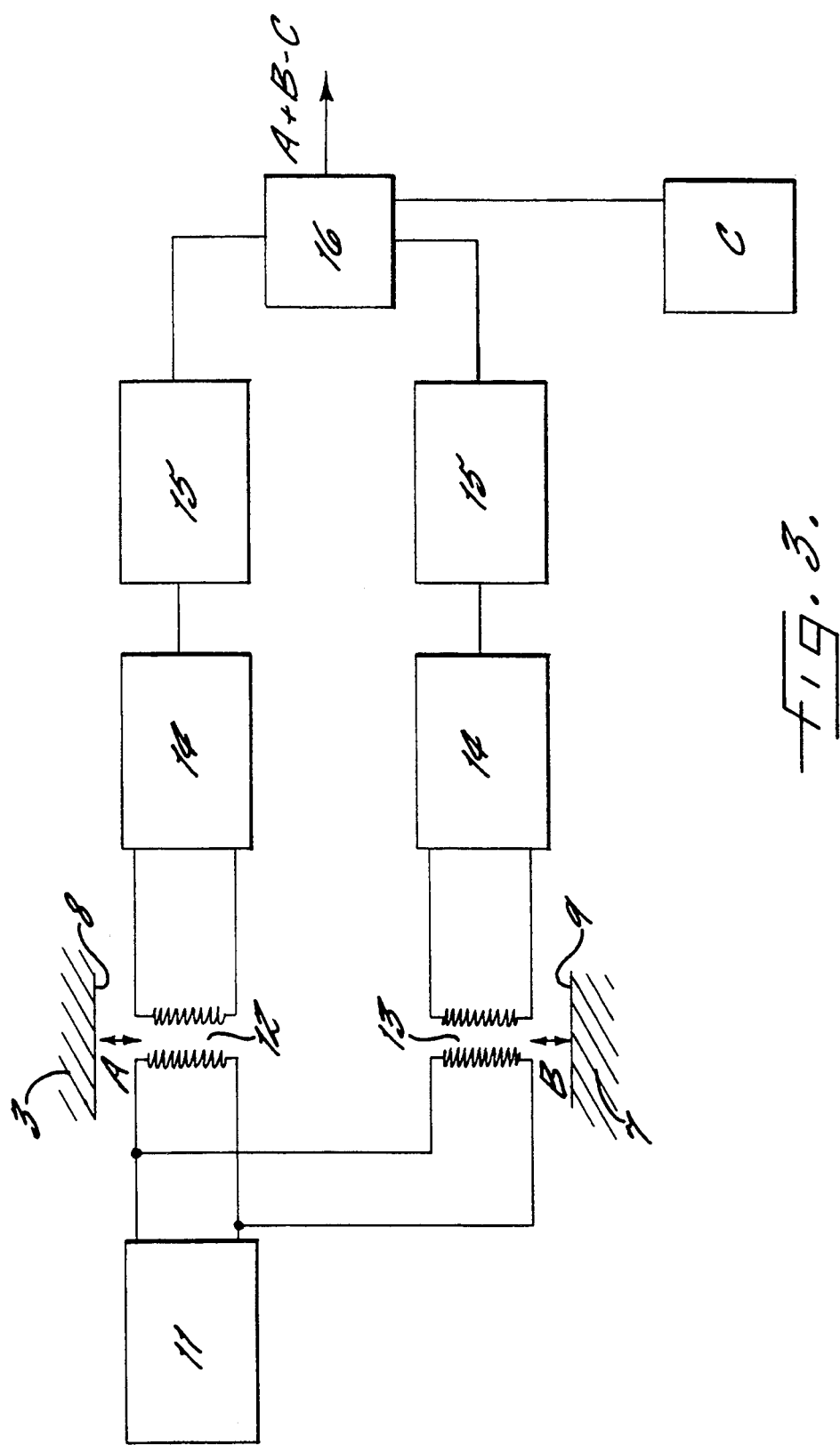

TORQUE TRANSMITTER

BACKGROUND OF THE INVENTION

The present invention relates to a torque transmitting apparatus which is characterized by the ability to continuously measure the torque being transmitted.

A torque transmitting apparatus of the described type is disclosed in DE 39 07 707 and corresponding U.S. Pat. No. 5,058,438, and wherein the torque passes through two members which rotate about a common axis, and which are interconnected by several axially directed integral beams. A plurality of fork-like elements are connected to the two members, and to a transducer ring, and upon the transmission of torque between the two members, the transducer ring is axially displaced by means of the fork-like elements. This axial movement is effectively amplified by the construction of the fork-like elements, and the axial movement is measured by a displacement measuring device, which indicates the transmitted torque. With regard to further details, express reference is made to the above referenced patents, whose disclosures are expressly incorporated in the present application by reference.

For the known torque transmitter, it is important that the displacement measuring device includes two sensors, with both sensors measuring in the same direction, i.e., on the one hand against the surface of the transducer ring, and on the other hand against a reference surface on one of the two rotatable members. The transducer ring and the reference surface are each designed and constructed in the shape of a ring, with the reference surface being radially arranged inside the transducer ring. Further, it is essential that the surfaces of the transducer ring and the reference surface, against which the sensors of the displacement measuring device measure, are located in the torque-free condition in one plane.

However, the above described known torque transmitter is extremely problematic in practice, as regards its measuring accuracy and the reproducibility of the measured results. This becomes especially noticeable, when in operation either the arrangement of the transducer ring and reference surface, or the arrangement of the displacement measuring device with the sensors arranged therein, are rotated or tilted relative to other components. Such a tilting of, for example, the sensors results in a change of the distances between the sensors and the surfaces of the transducer ring and the reference surface, with the distances from the transducer ring or the reference surface respectively varying in a different manner. This falsifies the measured result, i.e., the torque which is determined via the presumed proportionality of the displacement, with respect to the transmitted torque.

It is therefore the object of the present invention to provide a torque transmitter of the described type wherein error-free and reproducible torque measurements are possible regardless of slight tiltings between the transducer ring, reference surface, and displacement measuring device.

SUMMARY OF THE PRESENT INVENTION

The above and other objects and advantages are achieved in accordance with the present invention, by the provision of a torque transmitting apparatus which comprises first and second members which are rotatable about a common axis, with one of the first and second members including a first reference surface, which is preferably an annular surface which is substantially perpendicular to the rotatable axis. A transducer member is provided which includes a second preferably annular surface, and means are provided interconnecting the first and second members and transducer member such that the first and second surfaces are substantially parallel to each other and axially aligned with respect to each other. The interconnecting means also is configured for causing an axial movement of the transducer member and the second reference surface relative to said first reference surface in response to a torque being transmitted between the first and second members. Further, sensor means is provided which is mounted at a fixed location which is axially aligned with the first and second reference surfaces for sensing an axial movement of the surfaces relative to each other.

In a preferred embodiment, the sensor means comprises a first sensor for sensing the axial position of the first reference surface, and a second sensor for sensing the axial position of the second reference surface. The first and second reference surfaces may be positioned so as to be opposed to each other, with the two sensors positioned between the surfaces, or in another embodiment, the first and second reference surfaces may be positioned to face away from each other, with a first sensor opposite the first reference surface and a second sensor opposite the second reference surface.

In accordance with the invention, it has initially been recognized that the measuring error caused in the above described prior apparatus, for example, by the tilting of the displacement measuring device, originates from the fact that a tilting of the displacement measuring device causes a change in distance between the sensors and the transducer ring or the reference surface respectively. This change in distance caused by the tilting results from the necessary arrangement of the sensors, side by side or respectively on top of one another. Further, it has been recognized in accordance with the invention, that the foregoing difficulty can be overcome by positioning the reference surfaces of the transducer ring and the first rotatable member, against which the sensors measure, so as to be substantially parallel to one another. In other words, the reference surfaces of the transducer ring and the first rotatable member, contrary to the previously discussed known apparatus, form different planes arranged parallel to one another. Furthermore, it is important that the sensors occupy a fixed position relative to one another, and are arranged in the displacement measuring device in such a manner that they measure against the parallel surfaces of the transducer ring and the first rotatable member, either in an opposite direction to one another, i.e., facing away from one another, or directed toward one another, i.e. facing one another. Consequently, the present invention fully departs from the prior teaching of arranging the sensors side by side and of measuring in the same direction against surfaces extending in one plane. The arrangement of the transducer ring and reference surface in accordance with the present invention, and the arrangement of the sensors in a fixed position relative to each other, result in the advantage that at least at a slight tilting of the displacement measuring device relative to the transducer ring or reference surface respectively, the distance between the one sensor and the transducer ring changes by the same amount as the distance between the other sensor and the reference surface, but opposite in sign. In other words, when the displacement measuring device tilts or tips, the distance between the one sensor and the transducer ring increases by the same amount as the distance between the other sensor and the reference surface decreases, or vice versa. This dependence enables effortlessly a compensation for errors, so that the torques to be determined are free of such errors and reproducible.

As regards the arrangement of the displacement measuring device or specifically the sensors of the displacement measuring device, it is of special advantage, when the surfaces of the transducer ring and the reference surface are arranged facing one another and the sensors lie between these surfaces. In such an arrangement of the sensors, the sensors measure against the surfaces in a direction opposite to one another, and it is possible to determine the axial displacement of the transducer ring, as a measure for the transmitted torque, as a differential distance, i.e., the difference between the spacing with torque transmission and the spacing without torque transmission. To this end, it is preferred that the sensors have a common longitudinal axis. This, however necessitates a rigid mounting of the sensors relative to one another.

As an alternative, it is possible to arrange the surface of the transducer ring and reference surface facing away from each other, so that the sensors are arranged on opposite sides of the surfaces. In the case of such an arrangement, the sensors are directed against or face each other, with their active sides pointing toward the surfaces of the transducer ring and the reference surface. It is thus possible to determine the axial displacement or differential distance in the same manner as in the previously discussed embodiment. Within the scope of such an arrangement, the displacement measuring device could surround the transducer ring and the reference surface in the fashion of a yoke.

As regards the numeric determination of the torque, it is advantageous to determine the aforesaid differential distance from the sum of the distances between the sensors and the surface of the transducer ring and reference surface, inasmuch as the sum of the distances remains constant in the absence of a torque, even upon a tilting of the displacement measuring device. Furthermore, it would be possible to deduct the distance between the active sides of the sensors from the sum of the distances between the sensors and the surfaces, thereby eliminating a possible thermal expansion of the sensors or the displacement measuring device.

Likewise for the formation of the differential distance, it would be possible to deduct from the sum of the distances between the sensors and the surfaces a fixed value corresponding to the distances between the sensors and the surfaces at zero torque. Such a procedure would permit the direction of torque to be automatically calculated, inasmuch as the relative movement of the two surfaces would result, depending on the direction of rotation, in a positive or negative differential distance. For a thermal compensation, the two members rotatable relative to one another and the displacement measuring device could advantageously have the same coefficient of thermal expansion.

In order that the displacement measuring device is not subjected to vibrations or movements of the two members rotatable relative to one another, it is useful to mount the displacement measuring device at a fixed reference point. The displacement measuring device projects from the outside either between the transducer ring and the reference surface or into a region around the transducer ring and the reference surface coming close to their external surfaces.

In a further advantageous manner, the transducer ring and the reference surface themselves may be constructed as annular rings with parallel ring surfaces. These rings can be manufactured, for example, together with the two rotatable members by a melting or sintering process. Alternatively, the rings could be integral with the two members and deep drawn or, if need be, otherwise finished. In any case, it is advantageous to have the rings constructed so as to be integral with the two members.

As the two members themselves, the transducer ring and the reference surface may be composed of a corrosion-resistant material. Likewise, however, it is conceivable, in particular from the viewpoint of saving the cost of materials, that only the surfaces of the transducer ring and the reference surface be coated with a corrosion-resistant material. Such a coating has the advantage that a corrosion and the therefrom resulting reduction of distance from the sensors is precluded, thereby preventing a further source of error.

The evaluation of the signals generated by the sensors may be effected such that the output signals of the sensors representing the distance between each sensor and its associated surface are demodulated, linearized, added and, if need be, reduced by a constant value corresponding to the spacing between the measuring surfaces of the sensors. Further processing of the output signals from the sensors are conceivable. Discussions thereof, however, are deemed to be unnecessary, and reference is made to the relevant prior art.

The sensors of the displacement measuring device, which are used to measure the distance or displacement may operate by induction or the eddy-current principle. To this end, reference is again made to the relevant prior art.

Finally, it should be noted that the torque transmitter of the present invention has a substantially smaller diameter in comparison with the above discussed known apparatus. As a result of this, the space requirements are considerably reduced, while the measuring accuracy is simultaneously improved based on the smaller mass to be accelerated.

There are various possibilities of advantageously developing and further developing the teaching of the present invention. To this end, reference is made to the subsequent detailed description of two embodiments of the invention. In connection with the description of the preferred embodiments of the invention which follows, the preferred embodiments and further developments of the teachings will be discussed.

BRIEF DESCRIPTION OF THE DRAWINGS

Some of the objects and advantages of the present invention having been stated, others will appear when considered in conjunction with the accompanying drawings, in which:

FIG. 3 is a schematic block diagram showing a preferred embodiment of a signal processing sequence for use with the present invention.

DETAILED DESCRIPTION OF THE PREFERRED EMBODIMENTS

Figure 1:
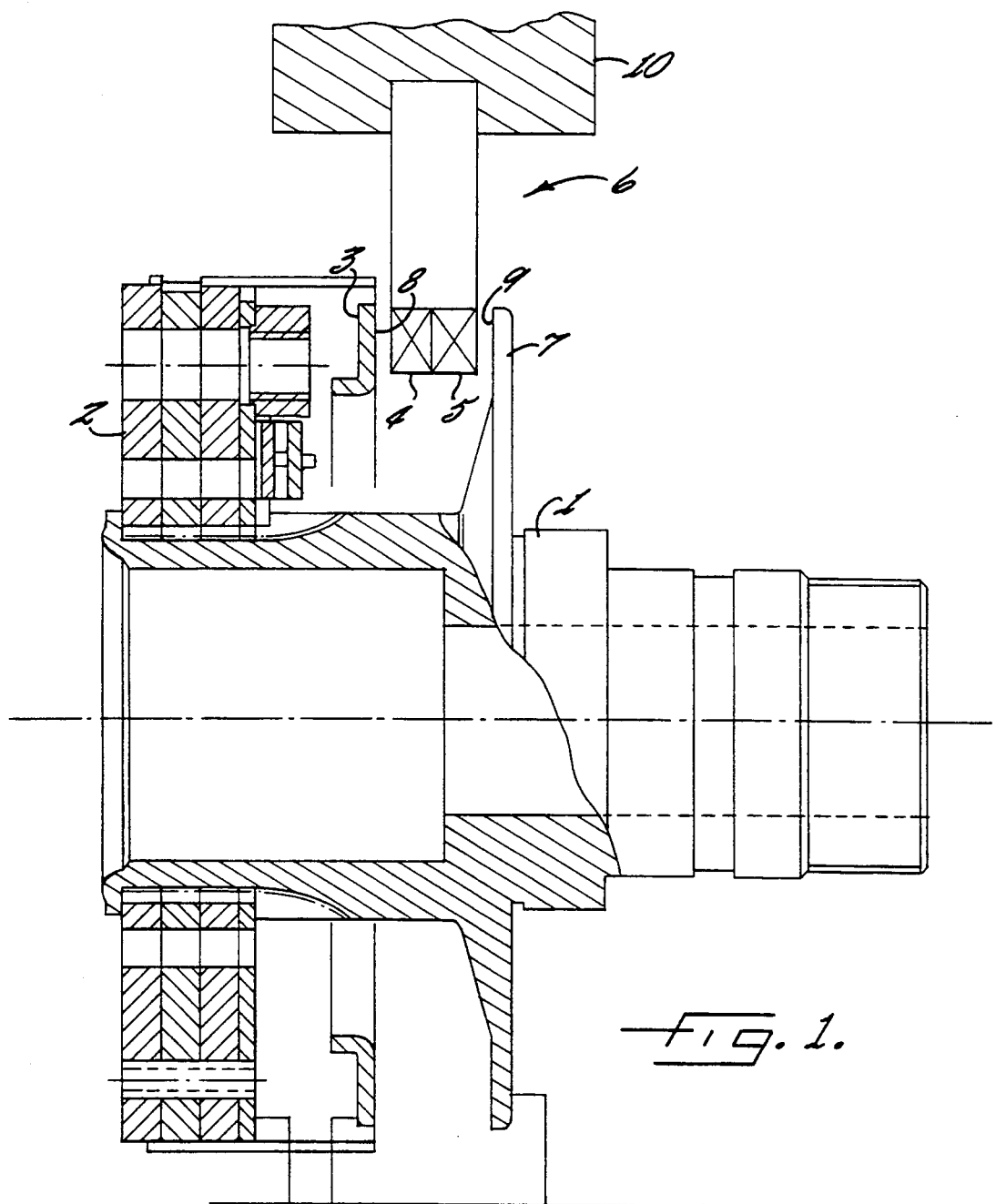
FIG. 1 is a schematic sectional view of a first embodiment of a torque transmitter in accordance with the invention.
Figure 2:
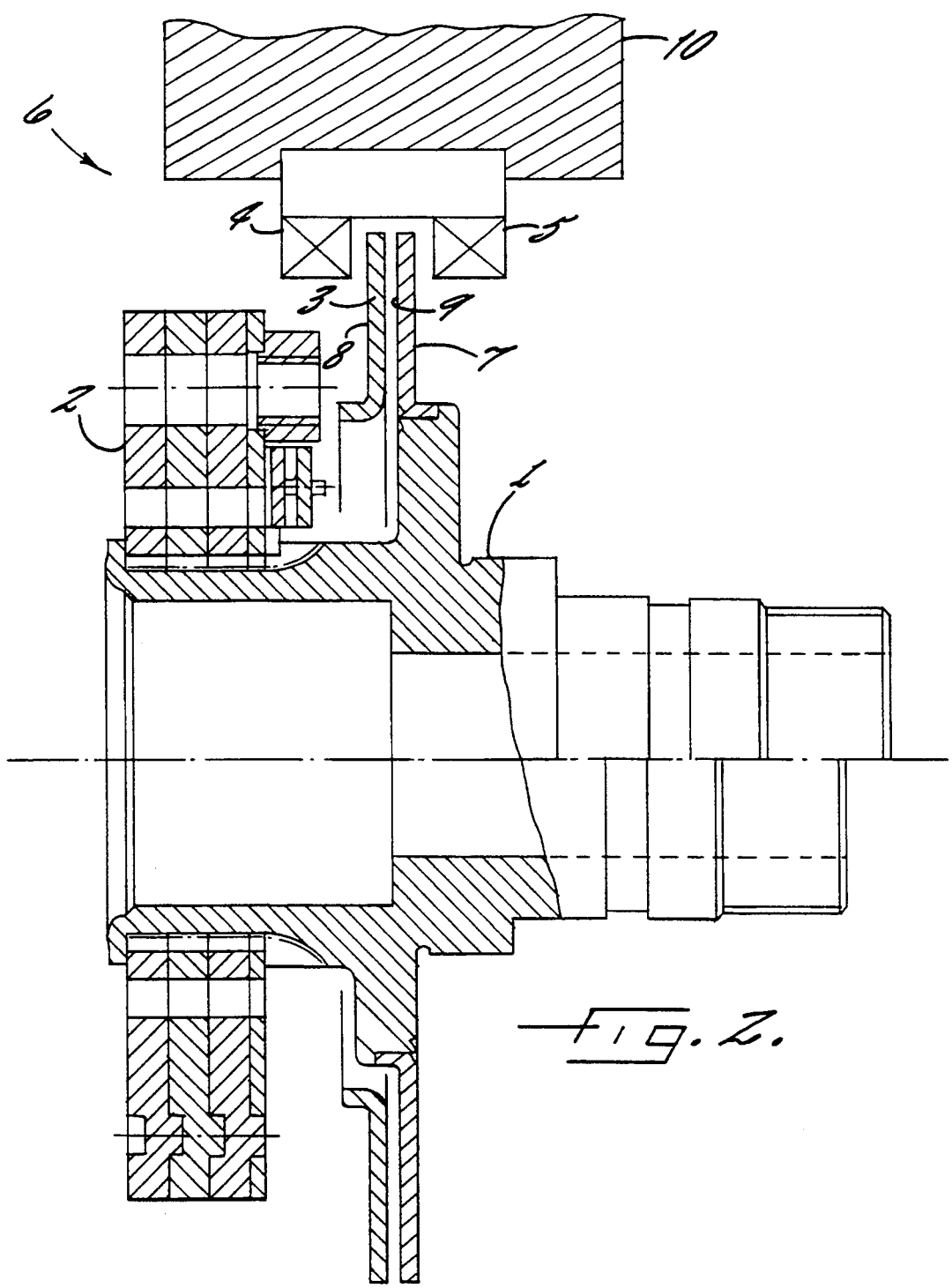
FIG. 2 is a schematic sectional view of a second embodiment of a torque transmitter in accordance with the invention.

FIGS. 1 and 2 each show an embodiment of a torque transmitter in accordance with the invention. Subsequently, in particular for a better understanding of the teaching of the present invention, only those parts of the torque transmitter will be described which contribute to a better understanding of the teaching of the present invention- With respect to further features of the torque transmitter not mentioned herein, express reference is made to DE 39 07 707 and corresponding U.S. Pat. No. 5,058,438.

The torque transmitter shown in FIG. 1 comprises two members 1, 2, rotatable relative to one another and serving to transmit the torque. Further provided are a transducer member or ring 3 which has an annular reference surface 8, and a reference part 7 which in integral with the member 1 and which includes an annular reference surface 9. A displacement measuring device 6 comprising two noncontacting sensors 4, 5 is provided for detecting the axial position of the transducer member 3 relative to a reference part 7. The members 1 and 2 are interconnected by the interconnection members as illustrated schematically in FIG. 1 at 20. As will be understood, the interconnection members may take the form of the beams and fork-like members as disclosed in the above referenced prior patents, and they cause an axial movement of the transducer member 3 and its reference surface e relative to the surface 9 of the reference part 7 in response to a torque being transmitted between the members 1 and 2. Thus, when a torque is transmitted between the parts 1, 2, the parts 1, 2 are rotated relative to one another proportionally to the torque, and the transducer ring 3 is axially displaced via the interconnection 20. The same applies to the embodiment of a torque transmitter in accordance with the invention, which is shown in FIG. 2.

In accordance with the invention, the transducer ring 3 and the reference part 7 are provided with surfaces e, 9 which are substantially parallel to each other and axially aligned. FIGS. 1 and 2 further show that the sensors 4, 5 occupy a fixed position relative to each other and are arranged such that they measure against the surfaces e, 9 in a direction opposite to each other (FIG. 1), i.e., facing away from each other, or facing toward each other (FIG. 2).

In the embodiment shown in FIG. 1, the surfaces S, 9 of the transducer ring 3 and the reference part 7 face each other, and the sensors 4, 5 are arranged between the surfaces e, 9 or respectively between the transducer ring 3 and the reference part 7 such that the sensors 4, 5 measure in opposite directions to one another against the surfaces e, 9, it thus being possible to determine the axial displacement of the transducer ring 3, which occurs upon a torque being transmitted through the members 1, 2.

In the embodiment shown in FIG. 2, the surfaces S, 9 of the transducer ring 3 and the reference part 7 face away from each other, and the sensors 4, 5 are directed toward each other on opposite sides of the surfaces e, 9. Thus the sensors 4, 5 measure in a direction toward each another against the surfaces e, 9, and the axial displacement of the transducer ring 3 can be determined accordingly as a differential distance.

FIGS. 1 and 2 indicate that the displacement measuring device 6 is mounted to a fixed frame member 10. The displacement measuring device 6 either extends between the transducer ring 3 and the reference part 7 (FIG. 1) or surrounds the transducer ring 3 and the reference part 7 in the fashion of a yoke (FIG. 2).

FIGS. 1 and 2 also show that the transducer ring 3 and the reference part 7 are arranged parallel to one another and are constructed as rings with parallel and planar ring surfaces each associated to one of the members 1, 2. By way of example, it can be noted from the Figures that the rings are integral with the members 1, 2.

FIG. 3 is a schematic block diagram of a signal processing sequence which may be used with the torque transmitter illustrated in FIG. 1, and in particular FIG. 3 illustrates the processing or preparation of the signals coming from the sensors 4, 5.

The sensors 4, 5 are first energized via an oscillator 11. The sensors 4, 5 are arranged with their coils 12, 13 between the transducer ring 3 and the reference part 7, or respectively between their surfaces e, 9. The output signals of the sensors 4, 5, which correspond to the distances between the sensors 4, 5 and the transducer ring 3 and the reference part 7 respectively are first demodulated 14, then linearized 15, and finally added 16. If need be, the added value is reduced by a fixed value corresponding to the sum of the two distance values at zero torque. A thermal compensation can be achieved in that the members 1, 2 and the displacement measuring device 6 preferably have substantially the same coefficient of thermal expansion.

The employed sensors 4, 5 may operate by induction or the eddy-current principle. To this end reference is made to the relevant prior art.

Finally, it should be emphasized that while the teaching of the present invention has been described with reference to the foregoing embodiments, it is by no means limited thereto. Rather, it is possible to realize the teaching of the present invention also in torque transmitters having different constructional features.

That is which is claimed is:

1. A torque transmitting apparatus which is characterized by the ability to continuously measure the torque being transmitted and comprising first and second torque transmitting members which are rotatable about a common axis, with one of said first and second members including a first reference surface, a transducer member which includes a second reference surface, means interconnecting said first and second members and said transducer member such that said first and second surfaces are substantially parallel to each other and axially aligned with respect to each other and including means for causing an axial movement of said transducer member and said second reference surface relative to said first reference surface in response to a torque being transmitted between said first and second members, and sensor means mounted at a fixed location which is axially aligned with said first and second reference surfaces for sensing an axial movement of said surfaces relative to each other, said sensor means comprising a first sensor for sensing only the axial position of said first reference surface, and a second sensor for sensing only the axial position of said second reference surface.

2. The apparatus as defined in claim 1 wherein said first and second reference surfaces are opposed to each other, and said sensor means is positioned between said surfaces.

3. The apparatus as defined in claim 1 wherein said first and second reference surfaces face away from each other, and said first sensor is opposite said first reference surface and said second sensor is opposite said second reference surface.

4. The apparatus as defined in claim 1 further comprising signal processing means responsive to output signals from said first and second sensors for calculating the difference between the spacing of said reference surfaces with torque transmission and without torque transmission.

5. The apparatus as defined in claim 4 wherein said signal processing means includes means for adding the distances between said sensors and the respective reference surfaces.

6. The apparatus as defined in claim 4 wherein said first and second sensors each have an active side which is adjacent its respective reference surface, and wherein said signal processing means includes means for adding the distances between said sensors and the respective reference surfaces and then subtracting the distance between the active sides of the sensors.

7. The apparatus as defined in claim 4 wherein said signal processing means includes means for adding the distances between said sensors and the respective reference surfaces and then subtracting a fixed value corresponding to the distances between said sensors and the respective surfaces at zero torque.

8. The apparatus as defined in claim 1 further comprising sensor mounting means mounting said sensor means at said fixed location, and wherein said first and second members and said sensor mounting means have substantially the same coefficient of thermal expansion.

9. The apparatus as defined in claim 1 wherein said first and second reference surfaces are each in the form of an annular ring.

10. The apparatus as defined in claim 1 wherein said first and second reference surfaces are coated with a corrosion resistant material.

11. The apparatus as defined in claim 1 wherein said first and second sensors operate by induction current.

12. The apparatus as defined in claim 1 wherein said first and second sensors operate by eddy current.

13. A torque transmitting apparatus which is characterized by the ability to continuously measure the torque being transmitted and comprising
first and second torque transmitting members which are rotatable about a common axis, with said first member including a reference member which includes an annular first reference surface which is substantially perpendicular to and coaxial with said axis,
a transducer member which includes an annular second reference surface,
means interconnecting said first and second members and said transducer member such that said first and second surfaces are substantially parallel to each other and axially aligned with respect to each other, and including means for causing an axial movement of said transducer member and said second reference surface relative to said reference member and said first reference surface in response to a torque being transmitted between said first and second members, and
sensor means mounted at a fixed location which is axially aligned with said first and second reference surfaces for sensing an axial movement of said surfaces relative to each other, said sensor means comprising a first sensor for sensing only the axial position of said first reference surface, and a second sensor for sensing only the axial position of said second reference surface.

14. The apparatus as defined in claim 13 wherein said first and second reference surfaces are opposed to each other, and said first and second sensors are positioned between said surfaces.

15. The apparatus as defined in claim 13 wherein said first and second reference surfaces face away from each other, and said first sensor is opposite said first reference surface and said second sensor is opposite said second reference surface.

* * * * *